United States Patent [19]

Pomerene et al.

[11] Patent Number: 4,903,196
[45] Date of Patent: Feb. 20, 1990

[54] METHOD AND APPARATUS FOR GUARANTEEING THE LOGICAL INTEGRITY OF DATA IN THE GENERAL PURPOSE REGISTERS OF A COMPLEX MULTI-EXECUTION UNIT UNIPROCESSOR

[75] Inventors: James H. Pomerene, Chappaqua, N.Y.; Thomas R. Puzak, Cary, N.C.; Rudolph N. Rechtschaffen, Scarsdale, N.Y.; Frank J. Sparacio, North Bergen, N.J.

[73] Assignee: International Business Machines Corporation, Armonk, N.Y.

[21] Appl. No.: 859,156

[22] Filed: May 2, 1986

[51] Int. Cl.⁴ ............................................. G06F 15/00
[52] U.S. Cl. ................................... 364/200; 364/247; 364/228.7; 364/231.8
[58] Field of Search ... 364/200 MS File, 900 MS File

[56] References Cited

U.S. PATENT DOCUMENTS

| | | | |
|---|---|---|---|
| 3,346,851 | 10/1967 | Thorton et al. | 364/200 |
| 3,573,736 | 4/1971 | Schlaeppi | 364/200 |
| 4,224,664 | 9/1980 | Trinchicri | 364/200 |
| 4,249,241 | 2/1981 | Aberle et al. | 364/200 |
| 4,384,324 | 3/1983 | Kim et al. | 364/200 |
| 4,574,349 | 3/1986 | Rechtschaffen | 364/200 |
| 4,574,350 | 3/1986 | Starr | 364/200 |
| 4,604,694 | 8/1986 | Hough | 364/200 |
| 4,794,518 | 12/1988 | Mizushima | 364/200 |
| 4,807,113 | 2/1989 | Matsumoto et al. | 364/200 |
| 4,807,115 | 2/1989 | Torng | 364/200 |
| 4,809,159 | 2/1989 | Sowa | 364/200 |

Primary Examiner—Gareth D. Shaw
Assistant Examiner—Rebecca L. Rudolph
Attorney, Agent, or Firm—Roy R. Schlemmer, Jr.

[57] ABSTRACT

A method and apparatus for controlling access to its general purpose registers (GPRs) by a high end machine configuration including a plurality of execution units within a single CPU. The invention allows up to "N" execution units to be concurrently executing up to "N" instructions using the GPR sequentially or different GPR's concurrently as either SINK or SOURCE while at the same time preserving the logical integrity of the data supplied to the execution units. The use of the invention allows a higher degree of parallelism in the execution of the instructions than would otherwise be possible if only sequential operations were performed.

A series of special purpose tags are associated with each GPR and execution unit. These tags are used together with control circuitry both within the GPR's, within the individual execution units and within the instruction decode unit, which permit the multiple use of the registers to be accomplished while maintaining the requisite logical integrity.

20 Claims, 10 Drawing Sheets

FLOW CHART FOR EXECUTE UNIT CONTROLS

FLOW CHART FOR DECODER CONTROLS

FLOW CHART FOR
DECODER CONTROLS

METHOD AND APPARATUS FOR GUARANTEEING THE LOGICAL INTEGRITY OF DATA IN THE GENERAL PURPOSE REGISTERS OF A COMPLEX MULTI-EXECUTION UNIT UNIPROCESSOR

FIELD OF THE INVENTION

The present invention has particular utility in the field of complex, high speed, electronic computer systems having the capability of executing millions of instructions per second. More particularly, it relates to such systems having a plurality of difference execution units capable of working on a single instruction stream simultaneously or in an overlapped execution configuration. Still, more particularly, it relates to a control mechanism and architecture for the management of data in the general purpose registers of such a system which guarantees the logical integrity of data placed in and extracted form such registers by individual execution units capable of operating asynchronously.

BACKGROUND OF THE INVENTION

The architectural definition of todays general purpose computers have implicit in its definitions the sequential nature of the instructions execution. In those areas where parallel operations are architected—for example, the operation of the channel in parallel with the CPU's program execution—special provisions are provided in the architecture to allow the programmer to synchronize his CPU program with the asynchronous I/O operation. The programmer correctly assumes that all the sequentially architected instructions are started and finished sequentially.

The designers of high performance sequential machines recognized many years ago that parallel execution of instructions would be useful to improve a machine's performance. Their first approach in this direction was to provide separate hardware facilities for the different stages in the execution of an instruction. Thus, if the execution of an instruction took "N" cycles; and if each cycle of the execution utilized a different hardware facility, then the design could theoretically be executed "N" instructions each in a different stage of completion. This concept is commonly called pipelining.

The designers of pipelined machines would use few or many hardware facilities to provide different degrees of pipelining, and hence performance. It should be noted that logical interlocks, (for example, the N'th instruction's input information would come from the N'th−1 instruction's output), and queuing on hardware facilities, has caused pipelined machines to perform at far less performance than their theoretical limit of one instruction per cycle. For a pipelined 370 machine to obtain an execution rate (assuming all data and instructions are resident in the cache) of one instruction for every three machine cycles one normal commercial code is considered good. The 3081 and 3090 are examples of IBM system 370 pipelined high performance systems. These machines always finish instructions in sequential order.

To further increase performance designers can take the approach of duplicating hardware facilities where queuing becomes a problem—usually on the execute units, caches, and data busses—, and allowing out of sequence execution completion. These extensions of pipelining, alleviate the queuing problem on hardware facilities, and reduce the effects of the logical interlocks. (It allows, for example, greater than "N" instructions to be initiated before the first is completed.)

The price that is payed for the increased performance is additional hardware, and increased control complexity to maintain the logical sequentiality the architecture demands. The IBM 91/95/195 processors utilized multiple execution units and out of sequence execution completion for the floating point operations of systems 360 architecture. The CDC 6600 and 7600 systems also utilized both of the above extensions of pipelining.

The present invention provides a unique method that allows, through a tagging and counting scheme, each general purpose register (GPR) of the system 370 architecture to be assigned a string of operations that must be executed sequentially upon said GPR. Further, these assignments can be intermixed with similar strings of operations for other GPR's. This technique will provide a framework to allow multiple independent streams of operations to each proceed sequentially, but concurrent to each other. It provides the proper logical interlocks, both within each stream, and between concurrent streams, which preserves the logical integrity of the utilization of the GPR's.

DESCRIPTION OF THE PRIOR ART

U.S. patent application Ser. No. 591,705 filed Mar. 21, 1984, now U.S. Pat. No. 4,574,349 of R. N. Rechtschaffen describes a method of renaming the 16 GPR's of system 370 into 256 hardware registers, these contain the contents of memory locations that were addressed on prior load instructions of the GPR's. If subsequent load instructions go to the same memory locations as indicated by X2, B2, and D2, this is determined through a fully associative scan of a pointer stack (Renaming Pointer Storage). The contents of a part of this stack contains the addresses of a register in an array of registers (Extension Registers) that contains the memory data of a previous load. This data is used immediately while the fetching of the actual data from memory is being accomplished and then compared to data from the Extension Register. Recovery steps are taken when a mismatch of data occurs.

As indicated above, both the intent and implementation technique of this application is quite different than the subject invention.

U.S. Pat. No. 3,346,851 (J. E. Thorton el al) discloses using a tagging scheme to provide sequencing between an instruction that uses a particular register as a SINK/SOURCE and a future instruction that uses this same register as a SOURCE/SINK. Its register management approach and implementation are completely different from the present invention.

Briefly, the implementation involves two 4 bit fields called "Queue Designations" that are associated with each execution unit. They are loaded with the "tag" or identifier of a first execution unit; whenever a SOURCE operand of a second execution unit will utilize the SINK operand of the first, and the first is executing an operation that is prior to the operation in the second.

If, in the above example, the first execution unit was executing an operation that is subsequent to that in the second execution unit, then the first unit will be prevented from writing its SINK operand into the SOURCE operand register of the second execution unit until the second unit has utilized this SOURCE.

This is accomplished through interrogation of a second set of 3 bit fields associated with each execution unit that are called F Designators. The F Designator field holds the basic register name; i.e., 1, 2, 3, 4, etc...; that are to be used for both SOURCE and SINK operands. Thus, if the interrogation encounters SOURCE F Designators for the SINK operand address of execute unit one, it will prevent execute unit one from updating of its SINK operand register.

In addition to being implemented differently than the present invention, this patent has the following functional differences;

1. An instruction using the same SINK register as a previous, as yet uncompleted instruction, cannot be issued from the decoder.

2. The execution units are particular as to type—add, multiply, divide, shift, etc...—and if a particular unit is busy when an instruction is decoded, the instruction cannot be issued from the decoder.

U.S. Pat. No. 4,313,161 discloses a system including a plurality of processors connected to a shared storage. A flag field is utilized in the storage address to "lock out" other processors. It is a fairly conventional configuration.

U.S. Pat. No. 3,718,912 relates to the assignment of register storage space to successive instructions. Each of the general purpose registers has tags associated therewith indicating the nature of data stored therein. This patent does not relate to a multi-execution unit system or to means for synchronously register usage between same. The particular flags defined herein and their usage are quite different from any suggestions in this patent.

Patents numbered 3,778,776; 4,334,269; are both concerned with multiple virtual memories. Neither of the patents has anything to do with the logical ordering, for out of sequence execution, of concurrent streams of operations, upon different general purpose registers, in an architecture that is basically sequential.

Pat.Nos. 4,334,269 deals with the definition of an efficient architecture of a pop-up stack CPU that has multiple general purpose registers. It is stated that with the disclosed architecture a simple compiler that is generally associated with a pop-up stack CPU will accomplish a data processing application with as few instruction as a complicated compiler that is generally associated with a multiple GPR architecture with no pop-up stack. The patent has nothing to do with the logical ordering, for out of sequence execution, of concurrent streams of operations, upon different general purpose registers, in an architecture that is basically sequential.

A number of additional references were found as a result of a prior art search which are not overly relevant to the present invention, other than that they deal with register assignment and management schemes. These include: U.S. Pat. No. 3,611,306, inventors Riegel et al, "Mechanism to Control the Sequencing of Partially Ordered Instruction in a Parallel Data Processing System"; U.S. Pat. No. 4,373,180, inventor, J. P. Linde, "Microprogrammed Control System Capable of Pipelining Even when Executing a Conditional Branch Instruction"; U.S. Pat. No. 4,363,096, inventors, J. A. Comfort, et al, "Arbitration Controller Providing for Access of a Common Resource by a Duplex Plurality of Central Processing Units"; U.S. Pat. No. 4,058,711, inventors, Robert M. Ondercin, et al, "Asynchronous Dual Function Multiprocessor Machine Control"; and an article in Vol. II, No. 11, Apr. 1969, IBM Technical Disclosure Bulletin by L. W. Smith, "Instruction Sequencing System", pgs. 1496-1497.

SUMMARY OF THE INVENTION

It is a primary object of the present invention to provide a method and, apparatus for guaranteeing the logical integrity of data stored in and accessed from reaching the general purpose register of a multiple asynchronous execution unit uniprocessor.

It is a further object of the invention to provide such a method and apparatus which allows the out of sequence use of said registers with respect to the instruction stream.

It is a further object of the invention to provide such a method and apparatus which uses special synchronizing tags and counters in conjunction with each general purpose register and execution unit, in a unique way, to preserve said logical integrity of the data in said registers.

It is another object of the invention to provide such a method and apparatus which utilizes said tags and counters so that a given general purpose register may be simultaneously used for a SOURCE and a SINK for a given execution unit as specified by a single instruction.

Other objects features and advantages of the present invention will be apparent from the subsequent description at the preferred embodiment of the invention including the drawings and the claims appended hereto.

The objects of the present invention are accomplished in general by an apparatus for controlling the access to the general purpose registers of a high speed, complex machine architecture including a plurality of execution units within a single CPU. By use of the invention, "N" execution units may be concurrently executing up to "N" instruction using different general purpose registers as either a SINK or SOURCE while, at the same time, preserving the logical integrity of the data within the GPR's. The invention allows a significantly higher degree of parallelism in the execution of the instructions than would otherwise be possible if only sequential operations were performed.

A group of at least four special purpose tag fields are associated with the access control circuitry of each of the general purpose registers.

Additionally, two tag types are utilized with each of the "N" execute units. Tags associated with each of the general purpose registers and each execute unit are used together with control circuitry associated with the instruction unit decoder, the GPR's and the individual execute units which permit a multiple use of the registers while maintaining the requisite logical integrity. Briefly, this is accomplished by storing an execute unit/GPR sequence trail between the individual GPR's and execute units so that before a given execute unit is permitted to utilize a particular GPR as a SINK, the immediately preceding SINK operation by a different execute unit must have been completed. Similarly, it is assured that all SOURCE accesses to a given GPR by one or more execute units are completed before a subsequent SINK operation is allowed to occur.

DESCRIPTION OF THE PREFERRED EMBODIMENT

Figure 1:
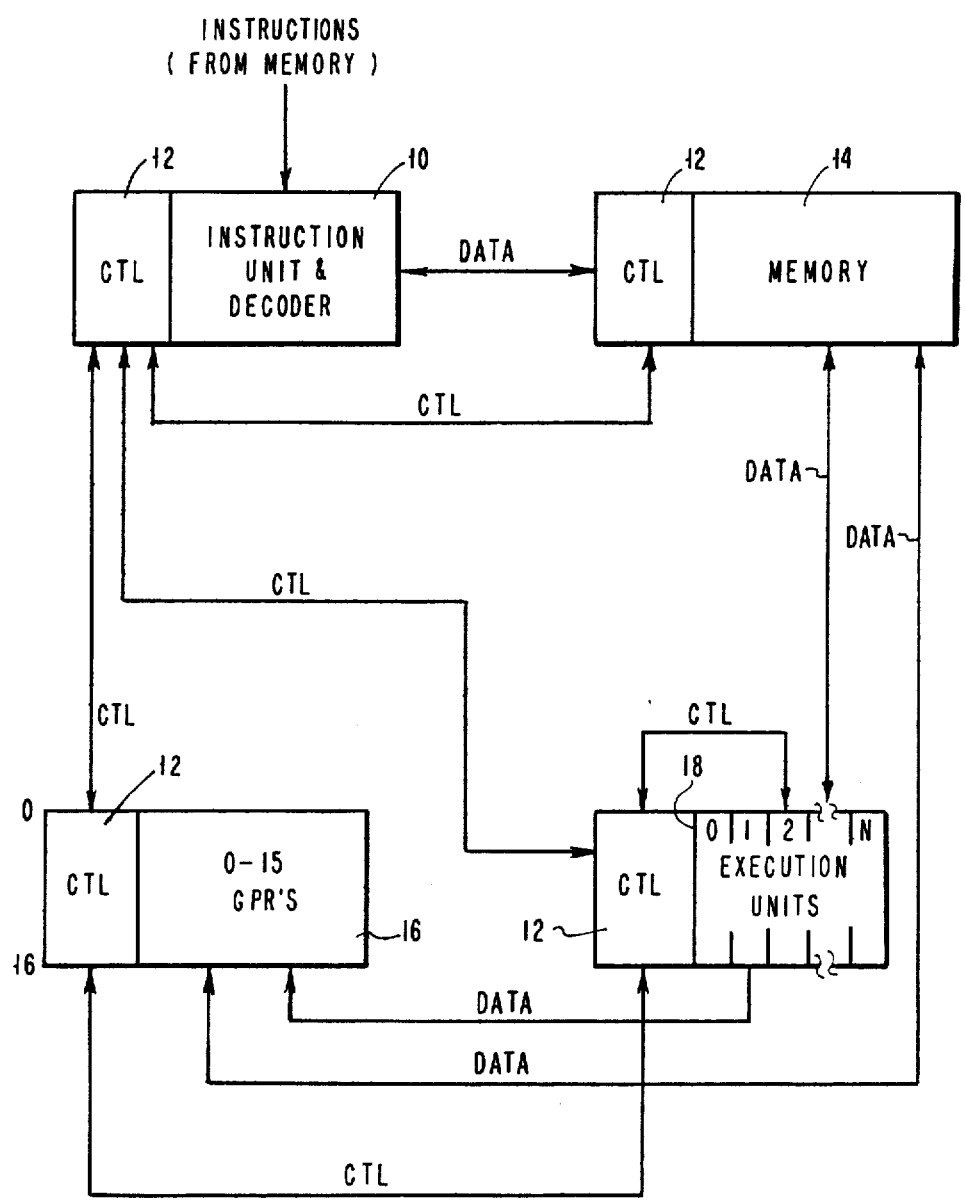
FIG. 1 comprises a functional block diagram of a typical complex high speed uniprocessor having plural execution units.

The basic concept of the present invention may best be appreciated by referring to the high-level functional block diagram of FIG. 1 which in illustrates the architectural environment of the present invention but, in a larger sense comprises a common architectural environment for any high speed complex multi-execution unit uniprocessor. The hardware disclosed in FIG. 1 is thus capable of executing the three essential phases of operation of such a computing system, namely fetching instructions, decoding the instructions and finally executing same. Instruction unit 10 accomplishes the function of accessing instructions from memory, including the various address generation phases involved, and placing them in the local instruction register. The Decoder and Control Mechanism 12 decodes the individual instructions, assigns same to the various execution units and assigns to the execution units the particular general purpose registers which are to be used for a given instruction as SINK or SOURCE. More significantly, for the purpose of the present invention, the Control Mechanism sets up the requisite operations whereby the various synchronizing tag fields are set during the register assignment phase of operation. These tag fields are checked during the execution phase of the operation before access is allowed as will be explained more fully subsequently. Memory 14 is conventional in nature and is addressed by the instruction unit to access instructions or by the execution units to access or store data.

The general purpose registers (GPR's) are conventional in nature but, in so far as their operation is concerned are unique in the present invention in that they are provided with a plurality of special synchronizing tag fields which will be explained more fully with reference to FIG. 2.

Similarly the N-execution units 18 are conventional in nature and could either be identical units or different units having different functional capabilities. The capabilities and functions would of course have to be known by the decoder. The unique feature of the execute units necessitated by the present invention is the provision of tag fields which are functionally associated with each of the execute units. These will be described more fully with respect to FIG. 2.

The essential or underlying feature of the present invention is the provision and management of the special synchronizing tags in both the general purpose registers and the execution units which are managed in a unique fashion. The required logical integrity of the general purpose registers is maintained, and operations using logically independent registers can be executed out of their original sequence in the instruction stream.

Figure 2:
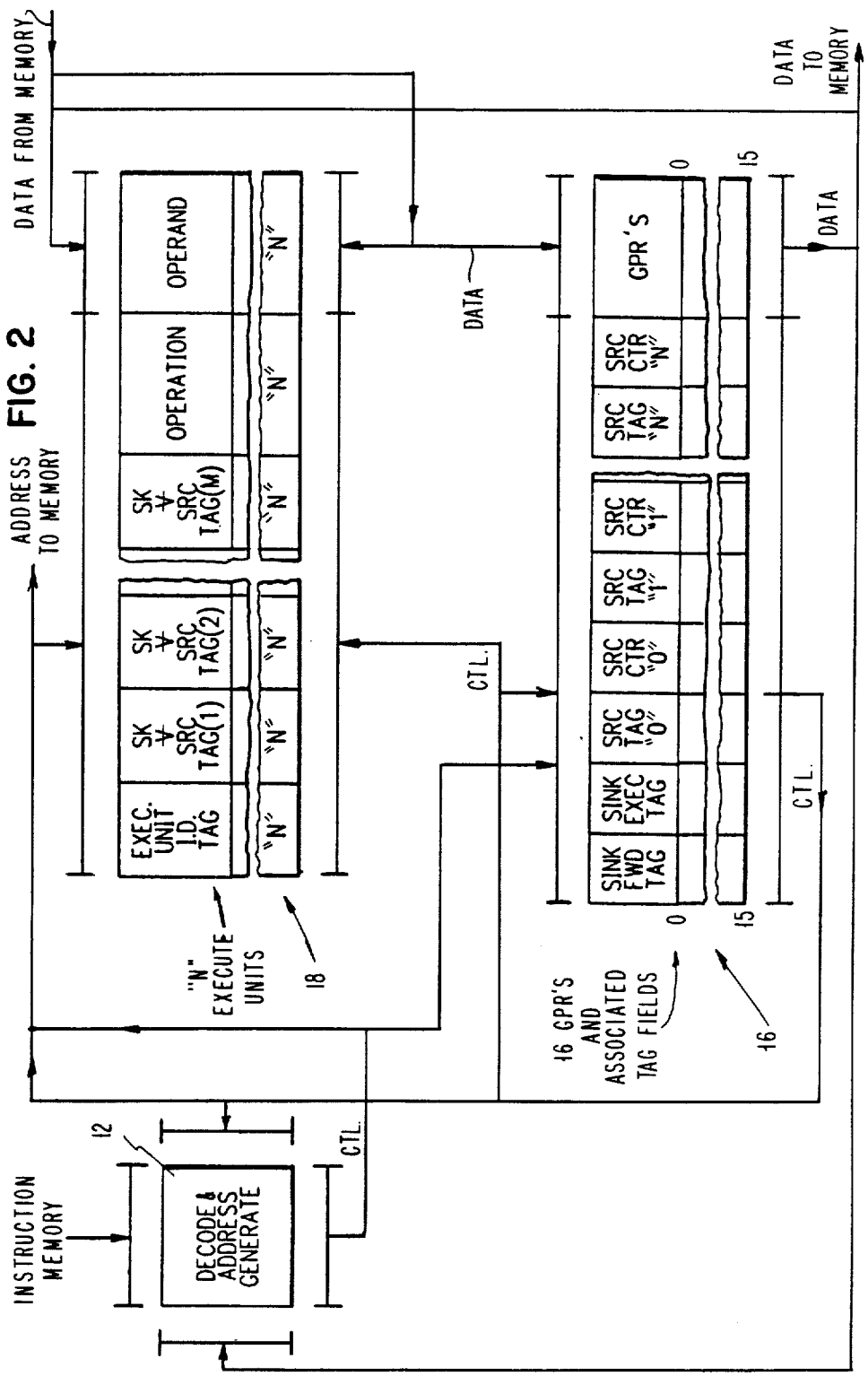
FIG. 2 comprises a more detailed functional block diagram of the system of FIG. 1 illustrating some of the physical details of the general purpose registers and the multiple execution units and clearly showing data flow within those portions of the system relevant to the present invention.

These tag fields and their functional location are clearly shown in FIG. 2. It is noted that the numerals 12, 16, and 18 in FIG. 2 refer to the same functional blocks as in FIG. 1 namely the decoder 10, distributed controls 12, the general purpose registers 16, and the "N-execute" units 18.

Before proceeding with a specific definition and explanation of each of the tags, it should be clearly understood that the basic underlying philosophy of the invention is to keep track of the sequence of the assignments of the various general purpose registers to execute units. The various tag fields located in or associated with each of the execute units and general purpose registers are utilized to perform this function.

More specifically each execute unit is, in effect, told which execute unit was assigned use of the register for SINK operations immediately preceding its own request to prevent its using the register prematurely for a SINK operation. Similarly the execute unit is advised as to which execute unit must use the register as a SINK immediately before it can use the register as a SOURCE. This, as will be appreciated, assures that the proper SOURCE value or operand is given to the requesting execute unit.

Referring to FIG. 2, it will be seen in examining block 16 that a plurality of tag fields is associated with each GPR. These are defined as a SINK FWD TAG, a SINK EXEC TAG, SOURCE TAGS (0-N) and SRC CTR's (0-N). Referring to the execute unit block 18, it will be noted that each execute unit has associated with it, e.g., in its individual instruction register, and EXEC unit ID tag, and a plurality of SINK V SRC TAG's (1-M) as well as fields to hold the operation, and the memory operand where M could be up to 16.

It should be noted in passing that the reason for the plurality of SINK, V SRC TAG's (1-M) tags is to allow for operations where it might be required to access more than one GPR for a given operation.

As an aid to understanding the subsequent description of the operation of the present system the following definition of each of the tags is set forth to explain precisely what is stored in each field and its general function in the overall operating scheme.

SINK FORWARD TAG

A Tag (or identifier) Field associated with each GPR that specified what execution unit was the last to be given authority to use the GPR for a SINK and has not as yet exercised this authority. If no execution unit has a request unexercised, then that tag will be on "home" status.

SINK EXECUTE TAG

A TAG field associated with each GPR that specifies what execution unit can next utilize the GPR as a SINK. If no execution has a request pending, then the tag will be on "home" status.

SOURCE TAG "0" THROUGH "N"

A TAG associated with each GPR that specifies the SINK forward tag at the time that an execution unit was given authority to use the GPR for a SOURCE. (If the operation uses the same GPR for a SINK, this tag is not activated). Successive SOURCE tags will be utilized with different SINK forward tags on successive unexercised SOURCE requests.

SOURCE COUNTER "0" THROUGH "N"

A counter field that counts number of execution units given authority to use the GPR for a SOURCE with the same SINK forward tag. It is associated with a particular SOURCE tag. When no request is pending for the SOURCE tag both tag and associate counter are on "home" status.

EXECUTE UNIT ID TAG

Each EXECUTE UNIT has a permanently assigned ID tag.

EXECUTE UNIT SINK OR SOURCE TAGS

Tag fields in each execution unit each of which can be either a SINK or SOURCE tag, (depending upon operation) that the execute units receive when they are given authority to use a GPR for SOURCE or SINK.

Figure 3:
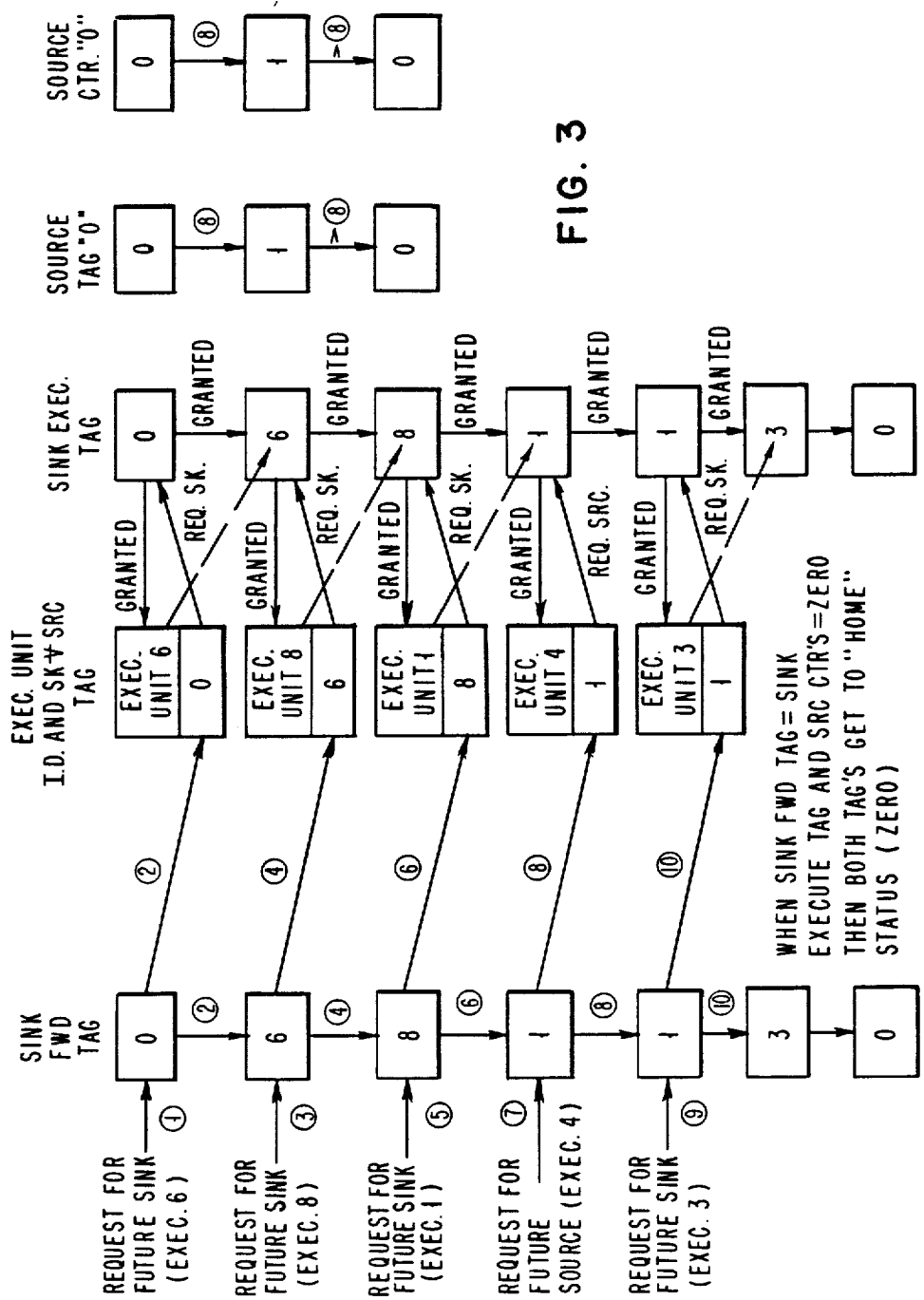
FIG. 3 comprises an illustrative graphical example of how the present system utilizes the various TAG and COUNTER fields defined by the present invention to set the required values in said fields for a particular sequence of instructions all of which require the use of a particular GPR.

Before proceeding with a specific description of the sequential operation of the system with reference to the operating example of FIG. 3 and the flow charts of FIGS. 4 through 9, the following is a general explanation of the underlying architectural use of each of the tag fields, which explanation, it is believed will materially aid an overall appreciation of the inventive concepts present.

The SINK forward tag is utilized essentially during the assignment phase of the operation of the system wherein a particular GPR is sequentially assigned to various execute units and wherein said sequence of assignments is reflected in said SINK forward tag. Wherever the decoder controls wish to assign the GPR to an execute unit the SINK forward tag tells the decoder controls the last execute unit which had use of the register as a SINK.

The SINK execute tag is utilized during the execution phase of the operation. At any given time, it indicates which execute unit last utilized the register for a SINK operation. As each execute unit utilizes the GPR for a SINK, its own unit ID is placed in the SINK execute tag field.

The SOURCE tag field stores the execution unit ID of the execute unit which utilized the GPR as a SINK immediately preceding the current requested use of the GPR as a SOURCE. Thus for a given SOURCE operation to occur the SINK execute tag must equal the SOURCE tag.

The SOURCE counter keeps a count of the number of execute units using that particular GPR value as a SOURCE. Each execution unit must wish the same SINK value. The number of allowable accesses is indicated by the SOURCE counter associated with a given SOURCE tag and is incremented during the assignment phase as required.

A plurality of SOURCE TAG/SOURCE counter pairs are indicated in FIG. 2 to take care of the requirement that more than one unexecuted SOURCE operation requiring the different SINK may be queued. As will be apparent anytime that a SOURCE request is made the GPR controls would have to determine which of the SOURCE tag fields match. Up to N SOURCE tag/SOURCE Counter pairs are shown, however in a practical environment, a small (probably 2) number of such pairs is all that would be required.

Referring now to the execute units, the execute unit ID tag merely indicates the code number for a particular execute unit an i.e., "1 through N". As will be understood this ID tag would be used consistently throughout the system and utilized as an execute unit identifier. For example, these execute unit ID tags are stored as required in the SINK forward tag fields and in the SINK V SOURCE tag fields.

The SINK or SOURCE tag fields in the execute unit, as stated adequately in the definition, indicate in each case, the particular SINK operation which must have been, most recently performed before the currently requested operation by the requesting execute unit may be permitted. Regardless of whether a SINK or SOURCE request is being made the actual tag field, in affect, reflects an immediately preceding SINK request for use by another execute unit.

If operations that involve more than two GPR's are to be handled, the number of SINK SOURCE tag fields must be increased. As is apparent, this number would be a maximum of 16 in the present system, since there are only 16 GPR's. The maximum useful number would be the number of GPR registers in a system. However, SOURCE lesser number could be specified without departing from the spirit and scope of the invention. As will be appreciated, for a given operation to be executed by a particular execute unit requiring a SINK or a SOURCE from one or more GPR's availability requirements would have to meet in each GPR before the operation could be completed. The accessing operation for each GPR would essentially operate independently but exactly as indicated in the subsequent example (FIG. 7) which is only looking at a single GPR and its associated controls for register access.

It will be readily appreciated from the preceding description that the present invention is architectural in nature and accordingly the herein disclosed embodiment architecturally discloses the embodiment for practicing the invention. All of the required register locations are clearly indicated in FIG. 2 and the requisite control sequences for practicing of the invention are clearly set forth in the flow charts of FIGS. 4 through 9.

The actual operations required of the system hardware are very straight forward and well known. Essentially they comprise gating various Exec Unit IDs into the requisite tag fields of the control memories associated with the execute units and the GPR's accessing the tag fields and making requisite comparisons and propagating the tags from one tag field into another as required. The particular hardware for performing these functions is notoriously old and well known in the art. The design of the controls sequences would be obvious to one skilled in the art from the flow charts.

As clearly indicated in FIGS. 1 and 2 the controls 12 are distributed throughout the system and control operations is then associated functional units. The operational sequences required of each control mechanism are clearly shown in the flow charts of FIGS. 4 through 9.

It will of course be understood that any physical embodiment of the present invention may assume many forms without departing from the spirit and scope of the underlying concepts. The various functions required could be performed by a combination of hardware and a conventional ROM control memory or entirely by hardware. However, the present invention has primary utility in high speed complex processing system and an all hardware control mechanism would be preferred. The actual tag field storage locations would be located in the various execute unit and GPRs as indicated in FIG. 2.

Before proceeding with a detailed description of the operation of the present invention with reference to the flow charts of FIGS. 4 through 9, it is believed that an understanding of the overall operation of the disclosed system can best be appreciated by referring to the example of FIG. 3 which clearly illustrates, together with the following explanation, just what occurs in the system. It should be understood that the example refers to a single GPR but that exactly the same things would linger in every GPR in the system as successive SINK and SOURCE operations occur.

Referring now to FIG. 3, an example of how the present system would operate to set various control sequences and tags within a particular GPR and a plurality of different execute units utilizing said GPR for SINK and/or SOURCE operations will be set forth. As stated above, this example refers specifically to a single GPR, but exactly the same types of operations would occur in any of the other GPRs which might be referenced by the given instruction stream being processed by the instruction unit decoder, or by an execution unit.

In the FIGURE only those tag fields which have relevance to the particular example are set forth.

As stated above, this example refers to the flow of data and operations within the controls for a single GPR register i.e., all requests are for the same GPR register. It will, thus, be appreciated that the five register requests entering the example at the left, mainly four SINK requests and one SOURCE request, are sequential with respect to each other but there might be a great many instructions interspersed between these instructions requesting different registers. However, it should also be understood that the operations described with respect to the example of FIG. 7 would be identical in function and operation in the control unit for any of the other registers.

Before proceeding with the example, it should be noted that there are essentially five columns shown in the FIGURE. The four columns designated SINK FWD TAG, SINK EXEC TAG, SOURCE TAG "0" and SOURCE COUNTER "0" are all associated with the GPR controls as indicated clearly in FIG. 2. The column designated EXEC Unit ID and SK V SRC TAG are associated with the execute unit controls.

The columns designated SINK FWD TAG, SINK EXEC TAG, SOURCE TAG "0", SOURCE CTR "0" each represent one register position. The different blocks in these columns represent the values stored in the register fields at different sequential points in the example. In the column designated EXEC UNIT ID and SK V SRC TAG, each block represents a different register in each indicated execution unit (i.e., five execution units are shown in the example). The indicated values again represent the contents of the registers, again at the indicated sequence point.

The numbered operations circles represent sequence points in the example i.e., (1) through (10) and refer to sequential operations performed by the instruction decoder and control mechanism to actually assign the particular GPR register to given execute units and appropriately set the various specified synchronizing tag fields in both the GPR controls and execute controls to assure the logical integrity of data as necessitated by the particular instruction sequence provided. These numbered sequence points are obviously sequential from 1 through 10. It being further noted that where the same number appears, the two indicated operations would occur substantially in parallel.

Finally, it will be noted that the dotted arrows passing between the column marked EXEC UNIT ID and SK SRC TAG and the column marked SINK EXEC TAG occur during the execution phase of the operations by the execute units and happen independently of the assignment of the register and execute unit tags. The arrows imply the transfer of an EXEC UNIT ID into the SINK EXEC TAG field as indicated. It should also be understood that the execution phase cannot begin until the first execute unit is able to obtain its required SOURCE and/or SINK registers from the GPR controls.

Figure 6:
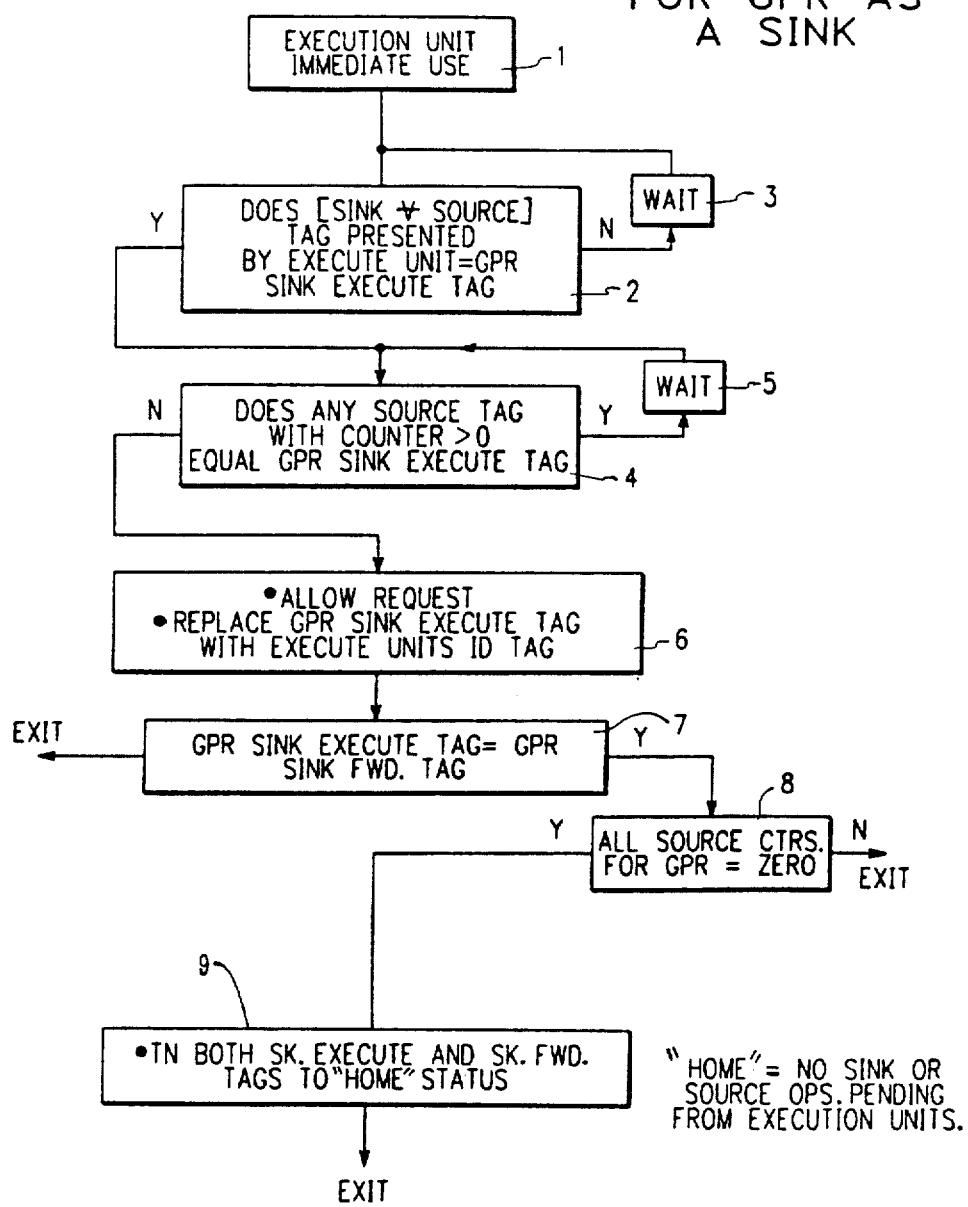
FIG. 6 comprises a flow diagram for the present system specifying the operations which must occur in the GPR controls when a request for the immediate use of a GPR as a SINK is received by the control mechanism from an execute unit.

Referring now to the example and FIG. 6 sequence point (1) at the left of the FIGURE indicates a request by the decode controls for a future SINK operation for the particular GPR for Execution unit 6 (EXEC 6). It should first be noted that all of the tags and counters in the GPR controls are set to "home" status or "0". This causes the SINK forward tag "0", presently in the GPR SINK FWD TAG field, to be transferred to the Execute Unit 6's SK V SRC TAG field. Concurrently Execute Unit 6's ID tag is stored in the SINK FWD TAG field for the GPR.

The next sequence to occur is that the decode controls request a future SINK use of the GPR for execute Unit 8. This causes the current SINK FWD TAG 6 to be placed in Execute Unit 8's SK V SRC TAG field, and concurrently the ID tag for Execute Unit 8 is placed in the SINK FWD TAG field of the GPR. (All during sequence (4)).

Upon the occurrence of sequence point (5) the decoded controls request for Execute Unit 1, a future SINK use for the GPR which causes (at point (6)) the SINK FWD TAG 8 to be stored in Execute Unit 1's SK V SRC TAG field and Execute Unit 1's ID to be placed in the GPR's SINK FWD TAG. At this point it will be noted that three consecutive SINK requests by Execute Units 6, 8, and 1, respectively, have occurred and since no operations have been stated to occur, the GPR's SINK Execute TAG is still set to (0).

At sequence point (7), a request for a future SOURCE is made by the decode controls for Execute Unit 4. This causes, at sequence point (8), the SINK FWD TAG for Execute Unit 1 to be placed in Execute Unit 4's SK V SRC TAG field. Concurrently, a determination is made that since this is a SOURCE request, the SINK FWD TAG of the GPR specifying Execute Unit 1 shall remain unchanged.

Concurrently, during sequence point (8) the EXEC UNIT ID for Execute Unit 1 is placed in SOURCE TAG "0" and SOURCE CTR "0" is set to a 1. This insures that when Execute Unit 4 wishes to use the GPR as a SOURCE Execute Unit 1 will have first used it as a SINK. The setting of the SOURCE CTR "0" to a 1 is an indication that only one Execute Unit is waiting to use the GPR as a SOURCE subsequent to the prior use of the Execute Unit 1 as a SINK.

Sequence point (9) indicates a request for a future SINK operation by the decode controls for Execute Unit 3. This causes (at sequence point (10)) the current SINK FWD TAG of the GPR (i.e., EXEC UNIT 1's ID) to be transferred to Execute Unit 3's SK V SRC TAG FIELD. Concurrently during sequence point (10), the Execute Unit ID for Execute Unit 3 is placed in the SINK FWD TAG.

This process would begin again when this particular GPR is to be assigned by the decoder to a requesting execute unit.

To recapitulate what has happened so far, at the end of sequence point (10), the SINK FWD TAG is set to the ID of Execute Unit 3, Execute Units 6, 8, 1, 4, 3 contain the SK V SRC TAGS indicated in the FIGURE. SOURCE TAG "0" will contain the execute unit ID for Execute Unit 1 and the SOURCE CTR "0" will be set to a one.

Assume now that the execute units are beginning to operate. As will be understood, only Execute Unit 6 will be able to gain access to the GPR for a SINK operation. This is because its SK V SRC TAG is "0" and this matches the SINK Execute TAG currently stored in that tag field. Thus, the SINK request will be granted and the results of the operation performed by execute unit 6 will be appropriately stored in the GPR and concurrently the EXEC UNIT ID for execute unit 6 is placed in the SINK EXEC TAG for the GPR. At this time only execute unit 8 will be able to gain access to the GPR for the same reason as specified above since its SK V SRC TAG is 6 which matches the SINK EXEC TAG currently in the SINK EXEC TAG field. Accordingly, its operation will be permitted and the EXEC UNIT ID for execute unit 8 will be stored in the SINK EXEC TAG field. Next, execute unit 1 and the control mechanism operate in exactly the same fashion as above and the EXEC UNIT ID for execute is placed in the SINK EXEC TAG field for the GPR.

At this point, execute unit 4 is a SOURCE request to the control mechanism and its SK V SRC TAG is compared with the SINK EXEC TAG field. They are found to match, both containing the EXEC UNIT ID for execute unit 1. However, since this is a SOURCE operation the SK V SRC TAG is also compared to the SOURCE TAG "0", and since it is found to match, the request is granted. The SOURCE TAG "0" is now reset to 'home' status i.e., ("0") and the SOURCE CTR "0" is reset to "0". Since this was a SOURCE operation the SINK EXEC TAG identifying execute unit 1 is left unchanged.

Next, the GPR controls handler execute unit 3 is SINK request. Its SK V SRC TAG is currently set to execute unit 1's EXEC UNIT ID and this is compared with the SINK EXEC TAG field and the two values are found to be equal. Accordingly, the SINK request is granted and next EXEC UNIT ID for the execute unit 3 is entered into the SINK EXEC TAG field.

At this point it will be noted that the SINK FWD TAG is currently set to the EXEC UNIT ID of execute unit 3 and similarly, the SINK EXEC TAG field is set to the EXEC UNIT ID for execute unit 3. The control mechanism will periodically check for this condition and whenever both tags are equal and, also the SOURCE CTR is set to "0", then both tags are reset to 'home' status. This means that no execution unit is currently waiting for use of the GPR.

As stated previously, the above example indicates the operations for a single GPR. However, it should be understood that exactly the same sequence of operations could occur within each GPR's control for any other GPR. It should also be noted that in the example only SOURCE TAG "0" and SOURCE CTR "0" are exercised. However, had there been more than one SOURCE request based on a different SINK value, subsequent SOURCE CTR's and SOURCE TAG's would have been set and whenever a particular execute unit requested a SOURCE operation, the GPR controls would have interacted with all of its SOURCE TAG's for a possible match. Thus, there might be many SOURCE TAG/SOURCE CTR pairs. Realistically, this number would probably be limited due to hardware limitations.

Similarly, it is possible that a given operation stored within an execute unit might require more than one GPR as a SINK or SOURCE. Although as far as a given GPR is concerned only a SINK or SOURCE request for that GPR would be seen by that GPR's controls; a request for a SINK or SOURCE use in another GPR would be handled in exactly the same way as in the present example and the request for the GPR would be granted only if the respective tags matched.

Figure 7:
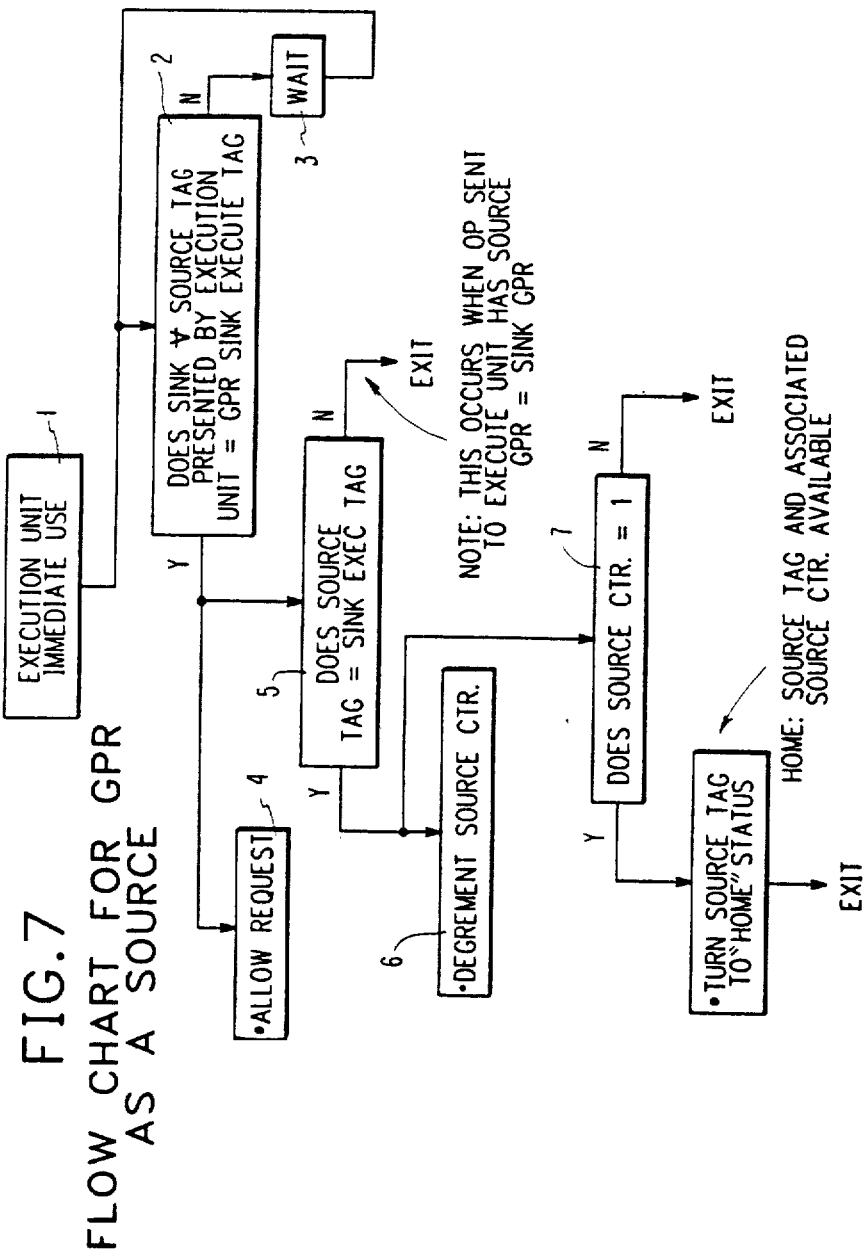
FIG. 7 comprises a flow diagram for the present system specifying the operations which must occur in the GPR controls when a request for the immediate use of a GPR as a SOURCE is received by the control mechanism from an execution unit.

This completes the description of the example of FIG. 7. It may be seen from this example that the proper sequence of operations (i.e., GPR access) is maintained in the system and that GPR controls are in place to automatically prevent any logical inconsistencies which might result from a GPR register being used as SINK or SOURCE out of the original instruction sequence.

Thus, with these controls individual register operations may occur within the system out of their sequence of occurrence in the instruction stream. However, due to the use of the present controls the logical integrity of the data flow within the registers is maintained completely. Even though the execute units operate asynchronously, they cannot actually overrun each other and access or store incorrect data.

The details of the operation of the present invention may best be understood by referring to the flow charges of FIGS. 4 through 9, which specify the operational sequences which must be performed by the GPR, execute unit and decoder controls.

Figure 4:
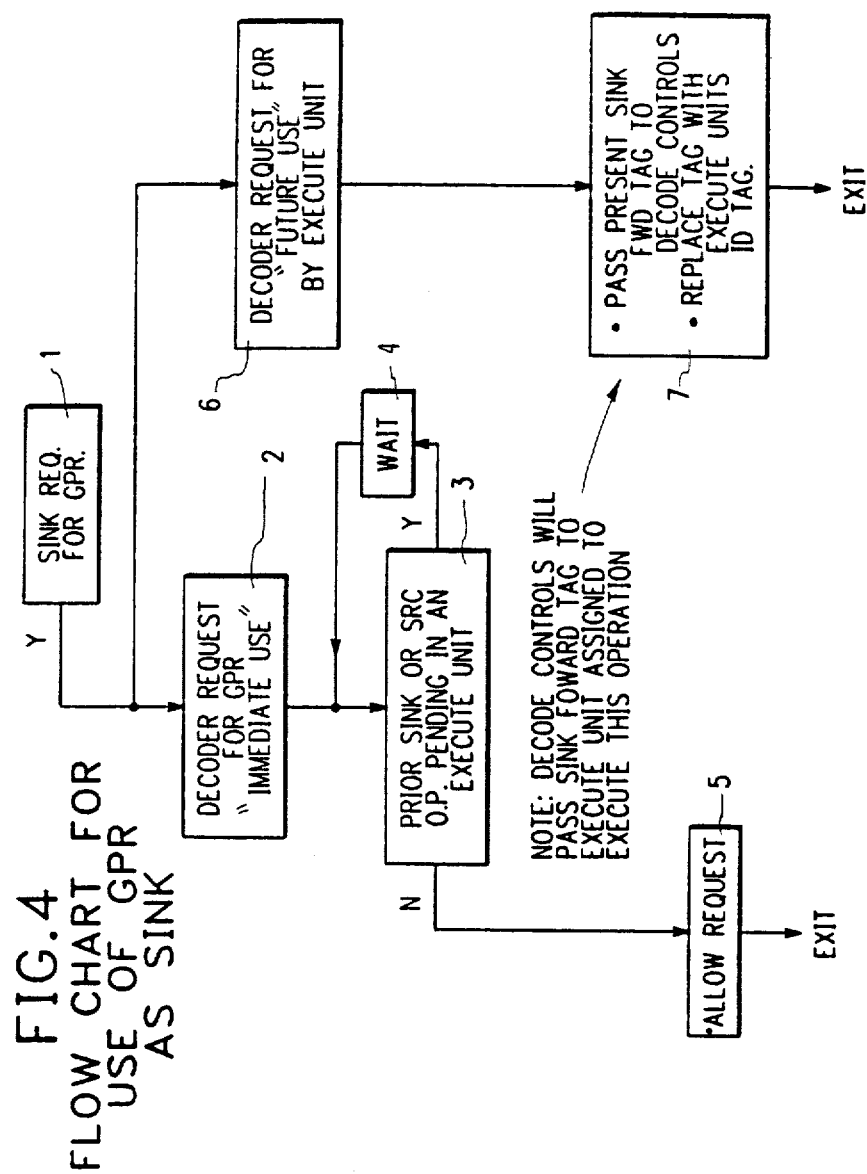
FIG. 4 comprises a flow diagram for the present system specifying the operations which must occur in the GPR controls when a request for a SINK GPR assignment is received by the control mechanism from the instruction decoder.

FIG. 4 comprises a flow chart of the GPR controls for that phase of the present system operation where a particular GPR is being requested as a SINK either for direct use by the decoder or for use by the decoder for assigning the GPR to a particular execute unit for future use.

Figure 5:
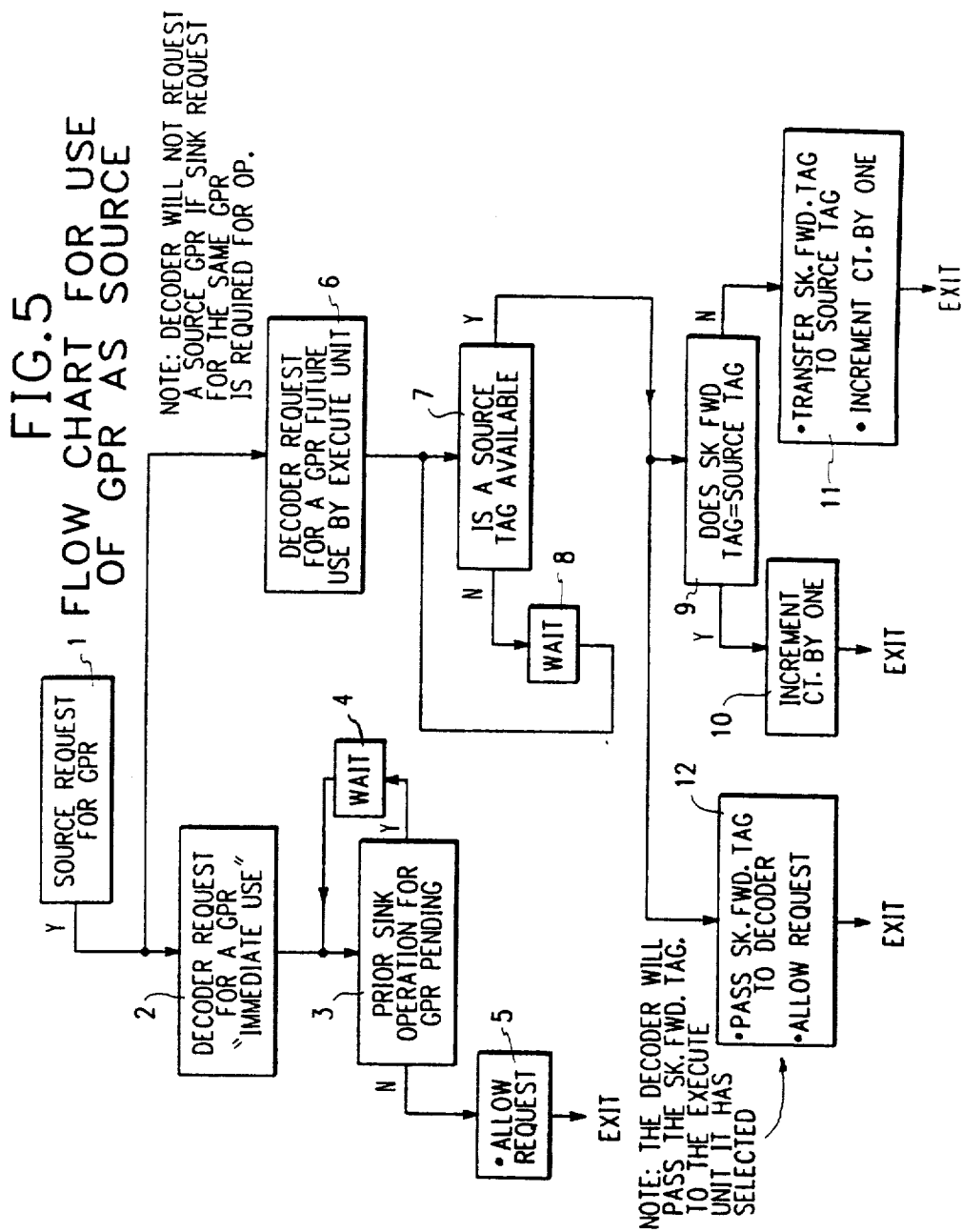
FIG. 5 comprises a flow diagram for the present system specifying the operations which must occur in the GPR when a request for a SOURCE GPR assignment is received by the control mechanism from the instruction decoder.

FIG. 5 is a flow chart of the GPR controls very similar to FIG. 3 which discloses the control sequence when use of the GPR as the SOURCE is requested either by the decoder for its own immediate use or for future assignment to an execute unit.

FIG. 6 is a flow chart of the GPR control sequence for an execution sequence for that illustrates the events which must occur when the SINK request is a request for immediate use by an execution unit e.g., during the execution phase of the operation of this system.

Similarly, FIG. 7 is a flow chart of the execution phase of a SOURCE request when the request is for immediate use by an execution unit during the execution is of its assigned operations.

Referring now specifically to FIG. 4, block 1 indicates merely that a SINK request for a GPR is being made by the decoder control mechanism, In block 2 a determination is made as to whether the decoder is requesting the GPR for its own immediate use such as for address generation purposes or the like. If this is the case the system proceeds to block 3. In this block, a test is first made to see whether a prior SINK or SOURCE operation is pending in an execution involving that GPR. If it is, the system waits, as indicated by block 4, until such prior operations are completed.

At this point the controls proceed to block 5 wherein an approval for the decoder request for the particular GPR's use is given.

One way for the test of block 3 to be made would be to determine if the SINK forward tag, SINK execute tag all SOURCE tags were all on zero. This would mean that the particular GPR was immediately available.

Returning to block 1, next assume that the system indicated that the decoder was not requesting the GPR for immediate use for itself. This would cause the GPR controls to branch to block 6 wherein a determination is made to see if the decoder is requesting a future SINK use for the GPR for some execute unit. Assuming that the test in block 6 is affirmative the system branches to block 7. Block 7 causes the present SINK forward tag associated with the GPR to be passed to the decode controls, which will forward the tag to the assigned execution unit. The Exec Unit ID tag for the particular instruction is stored in the SINK forward tag. This completes the current operation sequence and the decoder is ready to accept another instruction for decoding and register assignment.

Referring now to FIG. 5, which is a flow chart defining those sequences required of the GPR controls when a request for the use of a particular GPR as a SOURCE is made, block 1 indicates the decoding of the SOURCE request. Blocks 2, 3, 4, 5, are essentially the same or perform the same function except for SOURCE GPR, as blocks 2, 3, 4, and 5 of FIG. 3. They simply detect the situation where the decoder control wishes to use a particular GPR for its immediate use, or for the future use of the GPR as a SOURCE for an execution unit. To obtain immediate use for the decoder, the GPR controls continually monitor the control bits associated with the GPR, until the rest of block 3 is negative and the request is allowed in block 5.

Assume next that a negative response to the test made of block 2 on the figure is made. Block 6 of FIG. 5 makes a test similar to block 6 of FIG. 3 wherein it is determined whether or not the request for the GPR is for future use for the execute unit by the decoder controls, e.g., GPR assignment. Assume that the test in block 6 is affirmative, the GPR controls proceed to block 7 where a determination is made as to whether a SOURCE tag is available. It will be remembered that in the previous description of the system, especially with respect to FIG. 2 that there may be one or a plurality of SOURCE tag/SOURCE counter pairs available in the system. If there is only one such tag available, the system can only stack one SOURCE request or if there are three, it can stack three SOURCE requests, etc. Essentially the test of block 7 is looking for a new and available SOURCE tag or determining that the count of the existing SOURCE tag has not reached its limit. If neither is available the GPR controls monitor the control bits of the GPR until the system has processed enough SOURCE OPs for the particular GPR to make a SOURCE tag available.

Assuming that the test of block 7 is affirmative the system proceeds to blocks 9 and 12 in parallel. In block 9 a test is made to determine whether the current SINK forward tag of the GPR equals the SOURCE tag. If this is so, it means that this request is at least a second request for a SOURCE operation depending on the same value in the GPR. In this case the GPR controls would branch to block 10 wherein the SOURCE counter is incremented by one so that when the SOURCE accesses begin the proper number of accesses will be allowed to the GPR. Assuming that the test in block 9 were negative the GPR controls proceed to block 11.

In block 11 two things occur. The GPR controls cause the SINK forward tag to be forwarded to a SOURCE tag field of the GPR. They also cause the SOURCE counter to be incremented by one. It is noted that all of these operations are clearly illustrated in FIG. 3 at sequence point (8).

In block 12 the GPR controls causes the SINK forward tag to be passed to the decoder control mechanism. The decoder controls in turn pass the SINK forward tag to the execute unit where it is stored in the SINK or V SOURCE tag field associated with the execute unit. The control sequence then indicates that the SOURCE request for future use has been allowed and the procedure exits from the bottom of block 12 (ends).

FIG. 6 comprises a control flow-chart representing a request by one of the execution units for immediate use of a GPR for a SINK operation.

Block 1 of FIG. 6 indicates that a request for a GPR for immediate use as a SINK for an execute unit has been detected by the GPR controls. The control sequence proceeds to block 2. In this block a test is made to determine if the SINK forward tag presented by the execute unit equals the SINK execute tag currently in the particular GPR. This test, it will be remembered, establishes whether the immediately preceding SINK operation assigned to the GPR by the instruction stream has been completed. To recapitulate further, as each execute unit completes an operation its own execute units ID is set into the SINK execute tag field of the GPR. Further, the SINK tag stored in the execute unit represents an identification of the execute unit whose operation included a SINK request for the GPR immediately preceding the current execute unit's request. The test of block 2 thus assures the consistency of logical integrity of the data in the GPR. Block 3 as will be appreciated is merely a representation of continual monitoring by the GPR controls of the conditions specified in block 2 from all of the execute units.

Assume now that an affirmative result is detected for the test in block 2 and the GPR controls proceed to block 4. In this block a test is made to determine whether any SOURCE tag exists having its associated counter value greater than zero and which is equal to the GPR SINK execute tag. This test is utilized to determine whether an execute unit is currently attempting to utilize the GPR as a SINK while there is still another SOURCE operation pending in the system by another execute unit which requires the use of the current value stored in the GPR.

An understanding of this operation may be better appreciated by referring briefly to the example of FIG. 3 at sequence point (10). Assume the scenario that execute unit 3 is looking for SINK use of the GPR but that execute unit 4 has not yet requested the use of the GPR as a SOURCE. In this case the SOURCE tag "0" shown in the example would still be set at the ID of execution unit 1 and the SOURCE counter would still be 1. The test made in block 4 detects this condition and the SINK request made by execute unit 3 would have to wait via block 5 until execute unit 4 had exercised its SOURCE request and the SOURCE tag and SOURCE counter are both reset to zero, (in the example).

Assume next that the system proceeds to block 6. In block 6 the GPR controls allow the SINK use request and the current value of the GPR's SINK execute tag is replaced with the execute units ID tag, e.g., the execute unit that was just granted use of the GPR as a SINK. The control sequence then proceeds to block 7 where a test is made to see if the GPR's SINK execute tag equals the GPR SINK forward tag. If the determination of this test is negative, the procedure is completed. An affirmative result of the test block 7 moves the sequence to block 8. In block 8 a test is made to determine if all SOURCE counters for the GPR are equal to zero. If the determination made by this test is negative the procedure is ended. The meaning of this test is that a further SOURCE OP is still pending in the GPR and no tag fields need to be altered in response to the operation which was just allowed.

Assume next that the test of block 8 is positive, the system proceeds to block 9. The GPR controls, on reaching block 9, indicate that there are no prior SINK or SOURCE OPS pending involving this GPR in any of the execution units. The controls cause both SINK execute and SINK forward tags to be reset to zero or set to "home" status.

It should be noted that the system controls would operate even if the equal setting of the SINK execute and SINK forward tags were not changed to home status. An exit from block 9 indicates completion of this procedure.

Referring now to FIG. 7, this sequence represents an execution unit's request for immediate use of the GPR as a SOURCE. This is indicated clearly in block 1. The control sequence of block 2 causes a test to be made to determine if a SOURCE tag presented by the requesting execute unit equals the current SINK execute tag of the GPR. If the answer to this test is negative it means that required SOURCE operand has not been placed in the GPR by a former SINK operation and accordingly the control must wait via block 3 until the proper SINK execute tag is in place.

Assuming that the result of this test is affirmative the system proceeds in parallel to blocks 4 and 5. Block 4 indicates that the SOURCE request is allowed and block 5 initiates a further test. At this block a test is made to see if the SOURCE tag in the GPR is equal to the SRC tag from the execute unit. First assume that the result of this test is negative. This implies that the operation sent to the execute unit had a SOURCE GPR equal to a SINK GPR. This is the case as stated in the previous description of the FIG. 4 (especially see the note adjacent to block 6 of that FIGURE) where the particular operation is using the same GPR as a SINK and a SOURCE and the setting of the SINK request controls will automatically take care of the prior SOURCE request when the execution unit is ready to perform the operation. A negative result from the test sequence of block 5 indicates that the procedure is over.

Assume next that the result of the sequence of block 5 is affirmative, the system then proceeds in parallel to blocks 6 and 7. In block 6 the SOURCE counter associated with the SOURCE tag is decremented by one. In block 7 where the GPR controls causes the value in the SOURCE counter to be tested. (This is done prior to decrement of counter in block 6). If the result of the test is negative nothing further need be done. IF the test is positive (it will be zero when decrement occurs), it means that all SOURCE uses of the value currently stored in the GPR have been completed and the SOURCE tag should be returned to home status or be set to zero. The home status indicates that this SOURCE tag and its associated SOURCE counter are available to for a further SOURCE usage request from the execute units as they are presented to the GPR controls. Returning the SOURCE tag to home status completes this sequence.

Having described the required sequences of operation for the GPR controls set forth in FIGS. 4 through 7 there will now follow a brief description of the control sequences required of the EXECUTE UNITS, and the DECODER. It will of course be understood that only those control sequences are shown for these two units which apply to the register assignment and synchronization phase of the operation of the overall system which relates to the present invention. It will be further understood that the overall operating sequences for both the EXECUTE UNIT and the DECODER are far more complex but detailed but have no bearing on the present invention.

Figure 8:
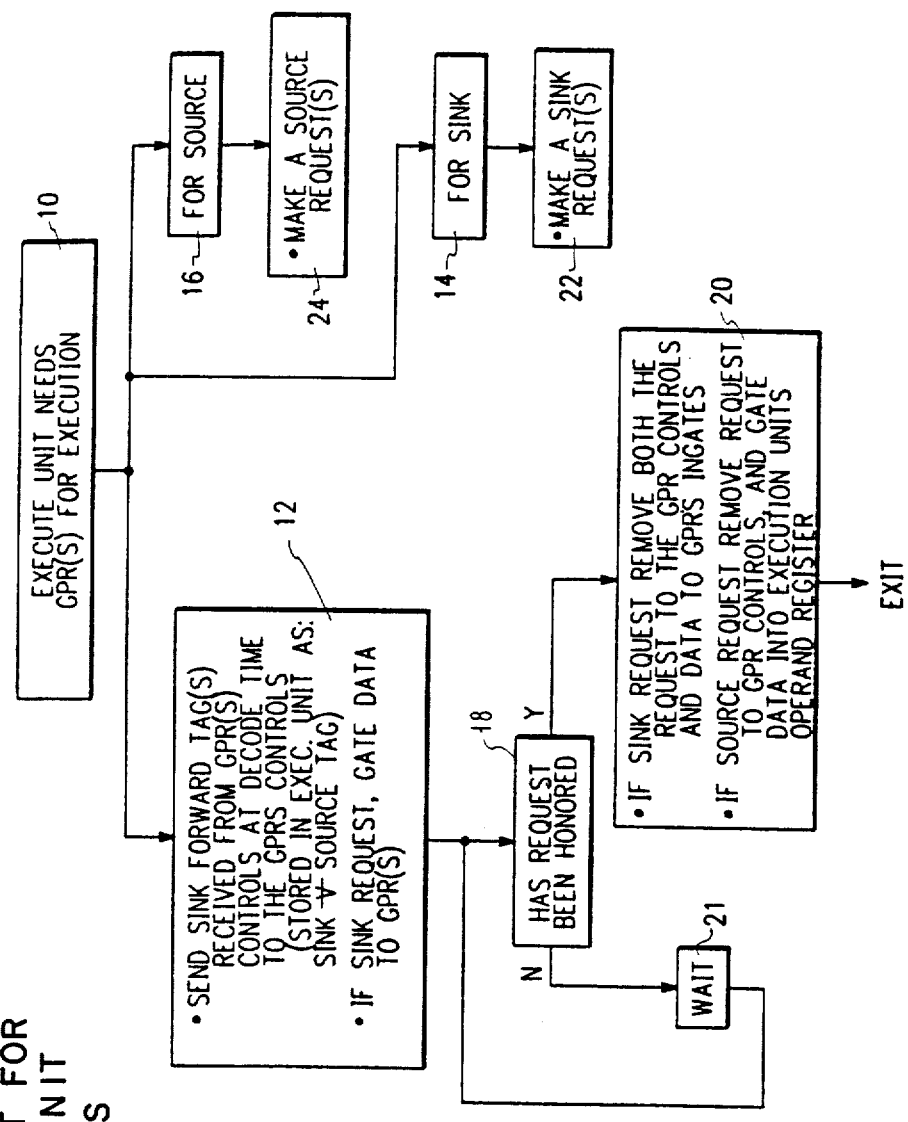
FIG. 8 comprises a flow diagram for the present system specifying the operations which must occur in the execute unit controls to request a particular GPR as either a SINK or a SOURCE.

Referring first to FIG. 8, a flow chart for the relevant EXECUTE UNIT controls is shown. A GPR request is entered via block 10 in the figure which indicates that an EXECUTE UNIT needs a GPR for a particular instruction which it is executing. The flow chart then proceeds in parallel to blocks 12, 14, and 16. Referring first to blocks 12, in this time frame, the EXECUTE UNIT controls send the SINK FORWARD TAG(S) which was received from the GPR controls during the original register assignment phase (occurring during decode time) to the GPR controls. It will be noted that these tags are stored in the EXECUTE UNIT controls as the SK V SRC TAG. If the current request (or one of the current requests) is for a SINK register, the data is placed on the data bus to the GPR, it being understood that it will not be actually gated into the particular GPR until said GPR accepts request.

Blocks 18 and 21 represent the testing and waiting sequences which allow the EXECUTE UNIT controls to idle until the various operations required in the GPR controls to be completed before the current request may be honored. Upon completion of the granting of the request, the EXECUTE UNIT proceeds to block 20.

In this block the EXECUTE UNIT controls perform the following operations. If the just completed request was a sink request, the request to the GPR controls is removed, and the data to the particular requested GPR's ingates is removed. If the just honored request is a SOURCE request, the request to the GPR controls is removed and the data is gated into the particular EXECUTE UNIT's operand register for execution.

As stated previously the output from block 10 goes in parallel to blocks 14 and 16 where a distinction is made as to whether the current request(s) is for a SOURCE or a SINK. If the operation requires (a) SOURCE operation(s), the system proceeds to block 16 or if for (a) SINK operation(s) to block 14 as will be readily understood.

If the requested access is for a SINK operation as indicated in block 14, the request to the GPR(s) controls would cause the GPR control sequence shown in FIG. 6 to begin or conversely if the requested access is for a SOURCE operation in the register, the control sequence in the GPR controls set forth in FIG. 7 would be entered. Blocks 22 and 24 cause a request to be made in effect to blocks 1 in FIGS. 6 and 7 respectively. It will of course be remembered that the operations of the EXECUTE UNIT caused by blocks 14 and 16 are in parallel to the operations performed in blocks 12 and 20. The operations occurring in blocks 14 and 16 of the EXECUTE UNIT controls initiate the requisite activity in the GPR control. Similarly, blocks 12 and 20 initiate the requisite operations within the EXECUTE UNITS.

On completion of the GPR access phase, (as indicated by the 'exit' from block 20) the EXECUTE UNIT controls may proceed to perform the execution of an instruction if the request was for a SOURCE operation or the instruction would have been completed if the request had been for a SINK operation.

Figure 9A:
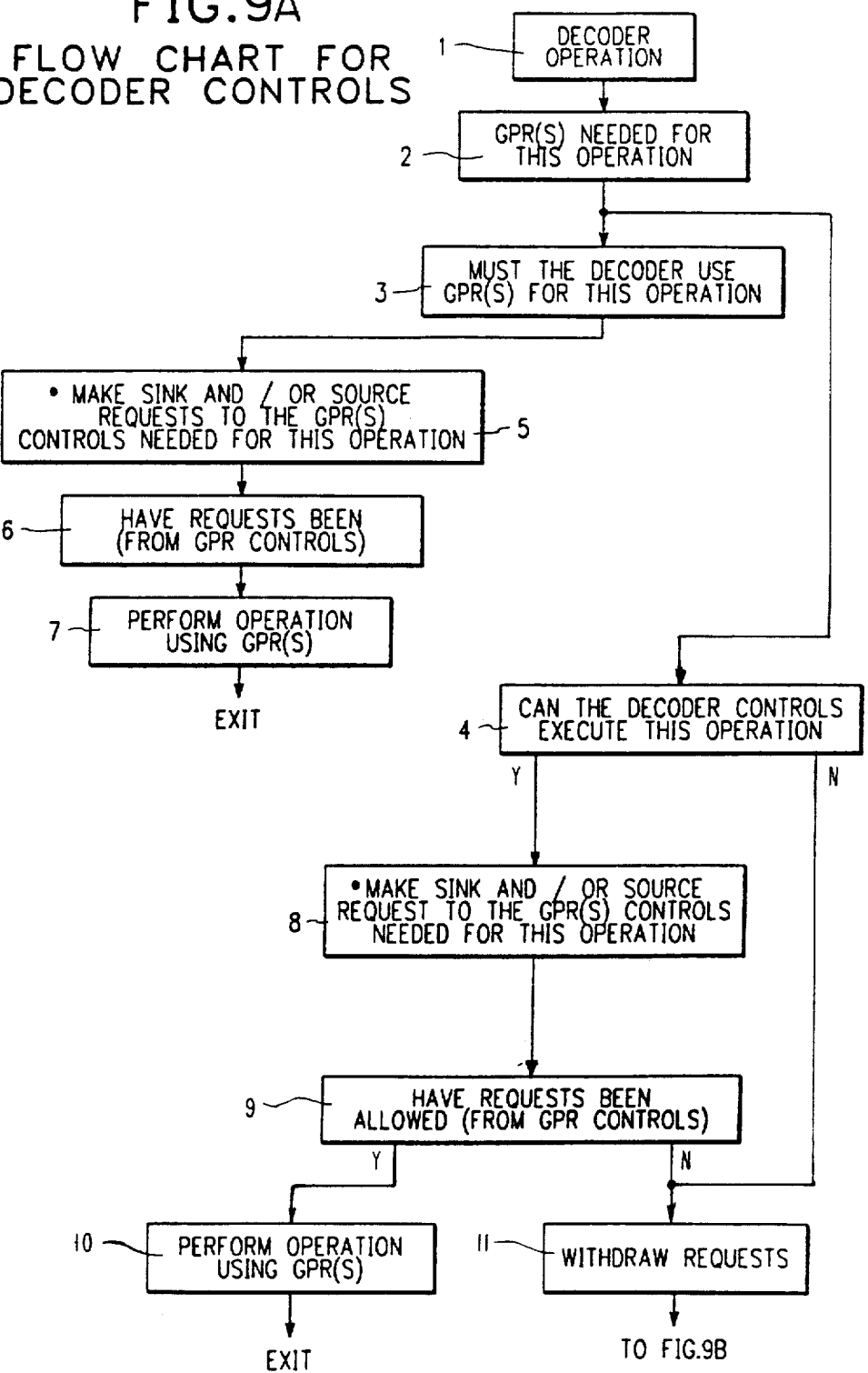
FIGS. 9A and 9B comprise a flow diagram for the present system specifying those operations that must occur in the decoder controls to effect the GPR register assignments to various execution units while maintaining the logical integrity of the data therein.

Referring now to FIG. 9 (A and B), the decoder control sequences necessary to the operation of the present invention are set forth. Blocks 1 and 2 merely indicate that the decoder has detected a need for a GPR operation. When this occurs the system must next determine if the request is for 'immediate' use by the decoder or for future use wherein the GPR register is to be assigned a particular EXECUTE UNIT. This test is made in parallel in blocks 3 and 4. If the request is for an immediate use such as an "address generate" the system proceeds to block 5 and the requisite SINK and/or SOURCE request are made to the control mechanism of the GPR needed for the operation. As will be understood, this block essentially enters GPR control sequences block 1 on FIGS. 4 and 5 which signifies an 'immediate' use request for the GPR. The decoder controls wait in block 6 until the request for the GPR has been allowed. Once the requested GPR is made available to the decoder, the particular operation is performed in block 7.

In block 4, again, a test is made to determine if the decoder controls can execute the requested operation. The controls can pass off the operation to an EXECUTE UNIT if all GPR's needed are not immediately available. An added requirement is that the operation must be completed in one machine cycle (e.g., a fixed point addition).

The operations performed in blocks 8, 9, and 10 are essentially the same as those performed in previously described blocks 5, 6, and 7 with the exception that all of the requested GPR's must be immediately available and if the indication of availability is not received in block 9 within the requisite time, the system proceeds to block 11 wherein the request is withdrawn and the operation is passed in due course to an EXECUTE UNIT. If the registers are available the operation will be performed in block 10 as is apparent.

Figure 9B:
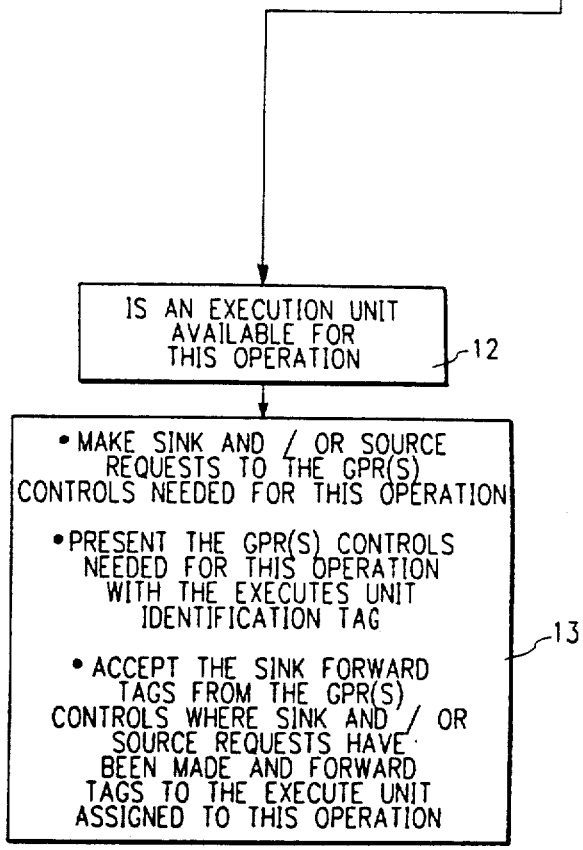

Assuming at this point that the operation is to be passed to an EXECUTE UNIT the control sequence passes to block 12 (FIG. 9B). In this block an available EXECUTE UNIT is assigned to the operation, or the system waits until such an execution unit is available. At this point, the sequence continues to block 13. In block 13 the decoder controls make the requisite SINK and/or SOURCE request to the controls of a particular GPR (S) needed for the operation. They present the GPR (S) needed for the operation with the EXECUTE UNIT'S identification tag. And finally, the decoder controls accept the SINK FORWARD TAGS from the GPR controls where the SINK and/or SOURCE request have been made and cause these tags to be forwarded to the particular EXECUTE UNIT assigned to this operation.

Thus, to recapitulate, block 13 causes block 1 of either FIG. 4 or FIG. 5 of the GPR controls to be initiated depending on whether the requested use is a SINK or SOURCE respectively. The EXECUTE UNIT ID is presented to the GPR controls in block 7 of FIG. 4. This operation is not necessary if the request is for SOURCE usage, as will be understood. The final operation performed by block 13 is done in conjunction with block 7 of FIG. 4 and block 12 of FIG. 5.

It should be noted that the storage of the SINK FORWARD TAGS from the GPR's in the SK V SRC TAG fields in the appropriate EXECUTE UNIT is done directly by the decoder as part of the instruction assignment operation to the particular EXECUTE UNIT wherein the instruction is appropriately stored in the execution unit's instruction register as part of the instruction.

This completes the description of the operation of the decoder control flow sequence. As stated previously it is only directed to that portion of the decoder control sequence which applies to the present invention. It is obvious that many other operations must occur in the decoder as will be well understood by those skilled in the art.

Having described the herein disclosed preferred embodiment of the present invention, it is believed that certain modification, alterations and substitutions could be made by those skilled in the art without departing from the overall scope of the invention as set forth in the claims.

For example, the sequential order of some of the operations in the flow charts could be changed or operations could be combined with other operations without naturally affecting the basic organization and use of the disclosed tag fields to assure register synchronization while maintaining the absolute logical integrity of the data.

Having thus described our invention, what we claim as new, and desire to secure by Letters Patent is:

1. In a complex high speed-multi-execution unit uniprocessor system having N-execution units and a plurality of General Purpose Registers (GPRs) each of which is accessible to each of the execution units, said system including an instruction decoder for decoding a sequence of program instructions to be executed by said system during an instruction decoding cycle, said N-execution units concurrently executing up to N decoded instructions during subsequent execution cycles, said execution units using the same GPR sequentially or different GPR's concurrently, the improvement comprising;

means for preserving the logical integrity of the data within the individual GPRs during simultaneous execution of sequential instructions, including supplementary storage means associated with each GPR for storing the unique IDs of execution units which are assigned usage of the specific GPR, means operative during the decoding cycle for assigning specific GPR Registers to be used as sources and sinks for each instruction, means for assigning an execution unit to each instruction by means of an identifying tag (ID) unique to such execution unit, stored in the storage means associated with respective GPRs, means operative during the execution cycle of said system for allowing an instruction to be processed by an execution unit when it is determined that the instruction is independent of the execution of one or more preceding instructions, said means for determining if an instruction is independent comprising means for determining if an identified GPR register to be used as a Source or Sink for a particular instruction being executed has an execution unit ID value stored in said supplementary storage means as the result of the execution of a preceeding instruction, that matches an execution unit ID value stored in the current execution unit and wherein, said means for decoding operates substantially independently of the execution of dependent instructions by the execution units.

2. A multi-execution unit uniprocessor system as set forth in claim 1 wherein said control mechanism includes means for determining if a request for a GPR contained in an instruction being decoded is for immediate use by the decoder, for a future assignment of use by a particular execution unit or for immediate use by an execution unit, and wherein said determinations are made during a decoding cycle of the control mechanism.

3. A multi-execution unit uniprocessor system as set forth in claim 2 wherein said control mechanism's means for loading said special purpose tag fields in said GPRs includes means responsive to said determining means for storing the identification tag of an execution unit currently being assigned a future SINK operation in the particular GPR in that GPR's SINK FORWARD TAG field.

4. A multi-execution unit uniprocessor system as set forth in claim 3 wherein said control mechanism for loading said special purpose tag fields in said GPRs includes means for retaining the identification tag of the execution unit which last requested a SINK operation in a GPR, in that particular GPR's SINK FORWARD TAG field when a request for a future SOURCE operation is detected during the decoding cycle.

5. A multi-execution unit uniprocessor system as set forth in claim 4 wherein said control mechanism's means for loading said special purpose tag fields in said GPRs includes further means operative when a request for a SOURCE operation is received, for determining if the current requesting instruction being decoded is requesting the same SINK value requested by an immediately preceding SOURCE request from another execution unit and, if so, incrementing a SOURCE CTR associated with a SOURCE TAG containing that SINK value, by one and, if not, storing the current value in the SINK FORWARD TAG field of the GPR in that GPR's SOURCE TAG field and incrementing its associated SOURCE CTR by one.

6. A multi-execution unit uniprocessor system as set forth in claim 5 wherein said control mechanism's means for leading said special purpose tag fields in said execution units includes means for loading a SINK V SOURCE TAG field in a particular execution unit with the value in the SINK FORWARD TAG field of the particular GPR whose use the execution unit is currently requesting.

7. A multi-execution unit uniprocessor system as set forth in claim 6 wherein there are as many SINK V SOURCE TAG fields in each execution unit as there are GPRs in the system and said control mechanism includes means for storing a SINK V SOURCE TAG value in as many SINK V SOURCE TAG fields of the execution unit as there are GPRs whose future use is being requested for a particular operation by the execution unit.

8. A multi-execution unit uniprocessor system as set forth in claim 7 wherein there are a plurality of SOURCE TAG/SOURCE CTR pairs in each GPR and said control mechanism includes means for storing the current SINK FORWARD TAG in the next available SOURCE TAG field if the SINK FORWARD TAG doesn't match the last assigned SOURCE TAG field whenever the GPR is assigned to a future SOURCE operation.

9. A multi-execution unit uniprocessor system as set forth in claim 8 wherein said control mechanism further includes means operative during the future use assignment operation when a request is for future SOURCE usage of a particular GPR to determine if there is a SOURCE TAG available in that GPR's controls set to "home" status and if so, granting the request and storing the current value of the SINK FWD TAG field in the SOURCE TAG field and leaving the SINK FORWARD TAG field in the GPR unchanged.

10. A multi-execution unit uniprocessor system as set forth in claim 6 wherein said control mechanism includes means operable, during the execution phase of operation, if a GPR request is for immediate use by the decoder, to allow such use only if there is no pending prior SINK or SOURCE request by an execution unit.

11. A multi-execution unit uniprocessor system as set forth in claim 9 wherein said control mechanism includes means operative, during the execution phase of operation, if the request is for immediate use by an execution unit, to compare a requesting execution unit's SINK V SOURCE TAG with the GPR's SINK EXECUTE TAG and, if the comparison is affirmative, to allow the request.

12. A multi-execution unit uniprocessor system as set forth in claim 11 wherein said control mechanism further includes means operative during the execution phase of operation, when an execute unit's request is for a SOURCE operation in a GPR, to decrement the SOURCE CTR associated with the GPR's SOURCE TAG, determining if the associated SOURCE CTR is at a predetermined value and, if so, resetting both the SOURCE TAG field and its associated SOURCE CTR to "home" status, and leaving the GPR's SINK EXECUTE TAG unchanged.

13. A multi-execution unit uniprocessor system as set forth in claim 12 wherein said control mechanism for loading said special purpose tag fields in said GPRs during the execution phase of the system operation further includes means operative, if the request is for a SINK operation, to replace the GPR's current SINK EXECUTE TAG with the requesting execution unit's ID TAG after granting the SINK request.

14. A multi-execution unit uniprocessor system as set forth in claim 12 wherein said control mechanism includes means operative during the execution phase of operation, when a request for immediate SOURCE usage for a GPR is received and wherein the GPR has a plurality of SOURCE TAG/SOURCE CTR pairs, first determining if the SK V SRC TAG from the execute unit matches the GPR's SINK EXEC TAG and, if so, determining which SOURCE TAG in the requested GPR's SOURCE TAG fields matches the SINK V SOURCE TAG field from the execute unit, allowing the SOURCE request and decrementing the SOURCE CTR associated with the matching SOURCE TAG by one, and determining if that counter has been decremented to a predetermined value and, if so, setting the particular SOURCE TAG and associated SOURCE CTR to "home" (no operation pending) status.

15. A multi-execution unit uniprocessor system as set forth in claim 14 wherein said control mechanism includes means operable during the execution phase of operation for requesting SINK V SOURCE access to all of the GPRs referenced in the various SINK V SOURCE TAG field in the execute unit which are required for a particular operation.

16. In a complex high speed multi-execution unit uniprocessor system having N-execution units and a plurality of General Purpose Registers (GPRs) each of which is accessible to each of the execution units, said system including an instruction decoder for decoding a sequence of program instructions to be executed by said system during an instruction decoding cycle, said "N" execution units concurrently executing up to "N" decoded instructions during subsequent execution cycles, said execution units using the same GPR sequentially or different GPR's concurrently, the improvement comprising a means for preserving the logical integrity of the data within the individual GPRs during simultaneous execution of sequential instructions, said means comprising:
- at least four special tag fields associated with each GPR, a SINK FORWARD TAG, a SINK EXECUTE TAG, and at least one SOURCE TAG/- SOURCE CRT pair, said tag fields controlling access by an execution unit to a GPR during said execution cycle,
- each execution unit having associated therewith instruction register storage means having, in addition to fields for storing an instruction to be executed by the execution unit, at least two special purpose tag fields for storing an identification (ID) tag unique to that execution unit and at least one SINK V SOURCE TAG, and
- a control mechanism including:
- assigning means for assigning instruction to execution units, loading means for loading said special purpose tag fields in said execution units and said GPRs during said instruction decoding cycle of the system operation, said control mechanism thereby preparing the execution units to execute instructions, said loading means loading a particular GPR's SINK FORWARD TAG field with the ID TAG of a first execution unit assigned an instruction which uses that GPR as a SINK and further loading the first execution unit's SINK V SOURCE TAG field with the ID TAG of a second execution unit which uses the particular GPR as a SINK immediately prior to the first execution units use of the GPR, as a source,
- means operable, as each of the execution units complete execution of an assigned instruction, to load a particular GPR's SINK EXECUTE TAG with an ID TAG of the execution unit which has just finished using it, thereby allowing the execution unit whose SINK V SOURCE TAG matches the particular GPR's current SINK EXECUTE TAG to access the particular GPR and wherein,
- said means for assigning operating substantially independently of the execution of dependent instructions by the execution units.

17. A multi-execution unit uniprocessor system as set forth in claim 16 wherein said means for loading said special purpose tag fields in said GPRs includes:
- means for retaining the ID tag of the execution unit which last requested a SINK operation in the GPR in the particular GPR's SINK FORWARD TAG field when a subsequent request for a future SOURCE operation is received,
- means further operative when a request for a future SOURCE operation is received for determining if the current requesting execution unit is requesting the same SINK value requested by an immediately preceding SOURCE request from another execution unit and, if so, incrementing a SOURCE CTR associated with a SOURCE TAG containing that SINK value by one and, if not, storing the current value in the SINK FORWARD TAG field of the GPR in an unused GPR SOURCE TAG field and incrementing its associated SOURCE CTR by one.

18. A multi-execution unit uniprocessor system as set forth in claim 16 wherein said control mechanism includes: means operative, if a GPR request is for immediate use by the decoder, to allow such use only if there is no pending prior SINK or SOURCE request by an execution unit,
- means operative, if the request is for immediate use by an execution unit, to compare a requesting execution unit's SINK V SOURCE TAG with the GPR's SINK EXECUTE TAG and, if the comparison is affirmative, to allow the request, if for SOURCE usage or if for SINK usage and there is no SOURCE request pending
- means operative, if a request is for a SINK operation by an execution unit, to replace the GPR's current SINK EXECUTE TAG with the requesting execution unit's ID TAG after granting the SINK request,
- means operative when an execute unit's request is for a SOURCE operation in a GPR, to decrement the SOURCE CTR associated with the GPR's SOURCE TAG, determining if the associated SOURCE CTR is at a predetermined value and, if so, resetting both the SOURCE TAG field and its associated SOURCE CTR to "home" status, and leaving the GPR's SINK EXECUTE TAG unchanged.

19. A multi-execution unit uniprocessor system as set forth in claim 16 wherein there are as many SINK V SOURCE TAG fields in each execution unit as there are GPRs in the system and said control mechanism includes means for storing a SINK V SOURCE TAG value in as many SINK V SOURCE TAG fields of the execution unit as there are GPRs whose future use is being requested for a particular operation by the execution unit whereby an instruction may specify the use the use of a plurality of GPRs for an instruction.

20. A multi-execution unit uniprocessor system as set forth in claim 19 wherein there are a plurality of SOURCE TAG/SOURCE CTR pairs in each GPR and said control mechanism includes:

means operative when a request is for future SOURCE usage, to first determine if there is a previous assignment of that SINK FORWARD TAG in a SOURCE TAG field and, if so, incrementing the associated SOURCE CTR and if not, to determine if there is a SOURCE TAG available in the GPR controls and, if so, granting the request and storing the current value of the SINK FWD TAG field in the SOURCE TAG field and leaving the SINK FORWARD TAG field in the GPR unchanged, and means operative when an execution unit is attempting to execute an instruction, when a request for immediate SOURCE usage for a GPR is received, for first determining if the SINK V SOURCE TAG of the execute unit matches the GPR's SINK EXECUTE TAG and, if so, determining which SOURCE TAG in the requested GPR's SOURCE TAG fields matches the SINK V SOURCE TAG field from the execution unit, allowing the SOURCE request and decrementing the SOURCE CTR associated with the matching SOURCE TAG by one, and determining if that counter has been decremented to a predetermined value and, if so, setting the particular SOURCE TAG and associated SOURCE CTR to "home" (no operation pending) status, said means being further operable for requesting SINK V SOURCE access to all of the GPRs referenced in the various SINK V SOURCE TAG fields in the execution unit which are required for a particular operation.

* * * * *